D. A. Cole.
Mach. for Hackling Shucks.

N°. 86,734.  Patented Feb. 9, 1869.

Witnesses,
J. I. Peyton
Baltis DeLong

Inventor,
D. A. Cole
by his Atty
Wm. D. Baldwin

DAVID A. COLE, OF NASHVILLE, TENNESSEE.

Letters Patent No. 86,734, dated February 9, 1869.

IMPROVEMENT IN MACHINE FOR HACKLING SHUCKS FOR MATTRESSES.

The Schedule referred to in these Letters Patent and making part of the same.

*To all whom it may concern:*

Be it known that I, DAVID A. COLE, of Nashville, in the county of Davidson, and State of Tennessee, have invented certain new and useful Improvements in Machinery for Hackling Shucks for Mattresses, and other purposes, of which the following is a full, clear, and exact description, reference being had to the accompanying drawings, which make part of this specification, and in which—

Figure 2:
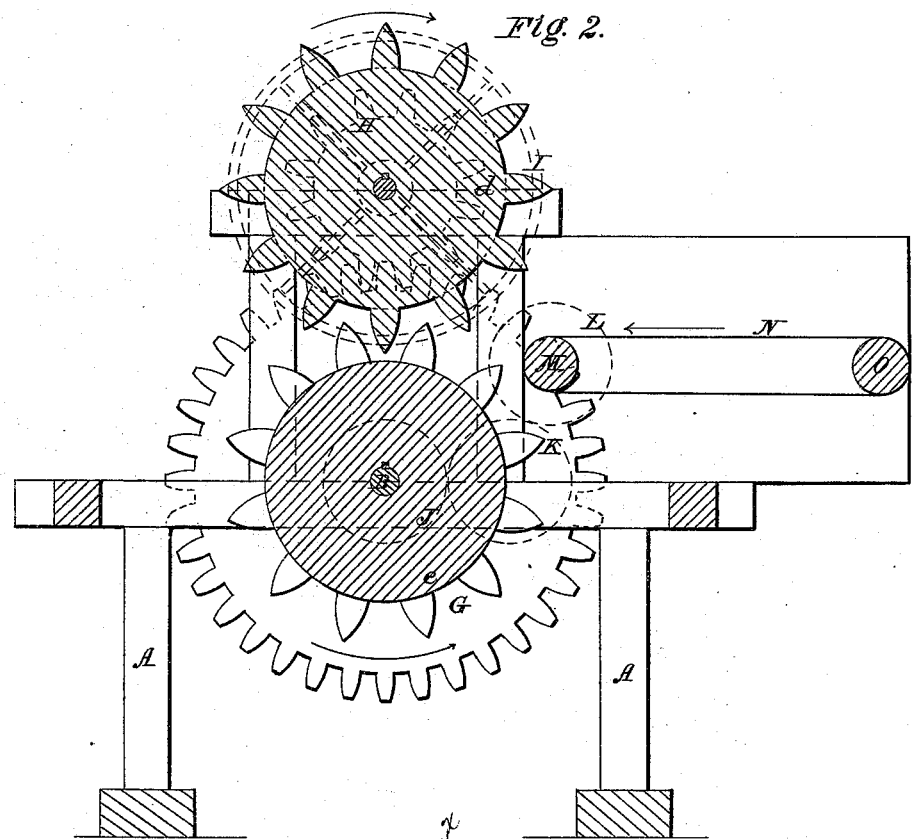
Figure 1:
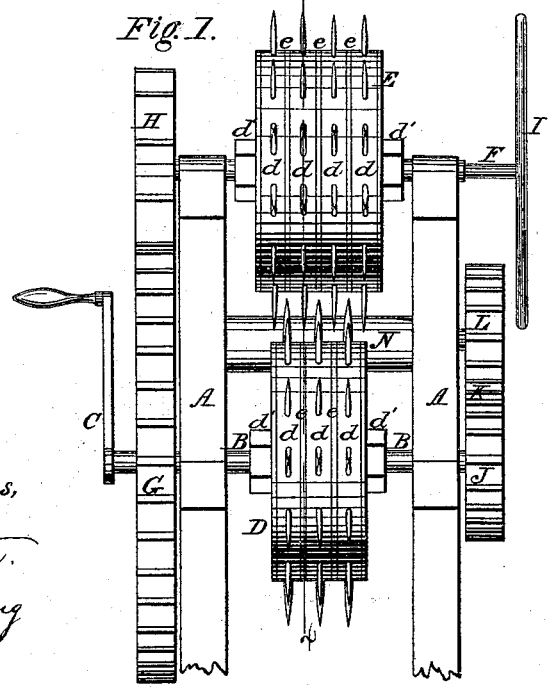

Figure 1 represents a view in elevation of so much of a machine embracing my improvements as is necessary to illustrate my invention, and Figure 2, a vertical longitudinal section through the same, at the line $x$ $x$ of fig. 1.

It is the object of my invention to hackle or split corn-shucks into narrow strips, suitable for upholsterers' purposes, such as stuffing for mattresses, sofas, chairs, cushions, &c.; to which end, The improvements herein claimed consist—

First, in a novel method of constructing a hackling-cylinder, by combining a series of toothed disks placed on a rotating shaft, with toothless disks interposed between them to regulate the distance between the teeth, and, consequently, the width of the strips into which the shuck is divided in passing through the machine.

Second, in a novel method of combining two hackling-cylinders, each having teeth adjustable laterally on their axes of rotation independently of each other.

Third, in a novel method of combining two toothed hackling-cylinders, so that one may revolve more rapidly than the other, and thus split or comb the shucks as they pass between the cylinders.

In the accompanying drawings, which exemplify one convenient way of carrying out the objects of my invention, the mechanism is shown as mounted in a stout main frame, A, of suitable form and proportions for the work required.

A driving-shaft, B, is mounted in suitable bearings on the frame, and may be driven either by a crank, C, or by a pulley, as circumstances may require.

I arrange a series of toothed hackling-disks, $d$, side by side, and clamp them securely together by jam-nuts $d'$, or other well-known equivalent devices.

I also arrange a similar series of toothed disks upon a second shaft, F, revolving in suitable bearings in the frame, parallel with the other driving-shaft.

The teeth are so arranged, that those on one shaft rotate in the spaces between those of the other, as shown in the drawings.

Ordinarily, I prefer to use disks about seven-eighths of an inch thick, about nine inches in diameter, and to have the teeth interlock about an inch and a half, and leave an interval or clearance between them of about one-eighth of an inch.

When necessary to increase the distance between the teeth laterally, a toothless disk, $e$, of smaller diameter, and of the required thickness, is interposed between each pair of the toothed disks, by which means I vary the width of the strips hackled, at pleasure.

A large spur-wheel, G, on the driving-shaft, gears into a corresponding pinion, H, of smaller diameter, on the second shaft.

The other end of this shaft carries a balance-wheel, I.

A spur-pinion, J, on the main shaft, drives an idle-wheel, K, which drives spur-pinion, L, on the end of a roller, M, over which an endless apron or creeper, N, travels, its other end running on a roller, O.

In operation, the shucks are laid lengthwise upon the cloth N, and fed by it between the hackling-cylinders D E.

One of the cylinders is geared to run four or five times as fast as the other; consequently, the teeth which move more rapidly split the shucks into slivers as they are held by the teeth of the slowly-moving cylinder, and as both cylinders revolve in the same direction, the shucks may be finely shredded, without tearing their fibres apart transversely.

What I claim as my invention, and desire to secure by Letters Patent, is—

1. The hackling-cylinders, constructed, as described, of a series of independent disks, corresponding with the number of rings of teeth, and clamped together upon their shaft, with a toothless disk of smaller diameter interposed between each pair of disks, for the purpose set forth.

2. The combination, substantially as described, of two hackling-cylinders, each having laterally-adjustable teeth interlocking with each other, for the purpose of varying the width of the strips hackled.

3. The combination, substantially as described, of the two cylinders, revolving at different speeds and in the same direction, for the purpose set forth.

4. The combination of the endless feed-apron with the hackling-cylinders, arranged and operating as described.

In testimony whereof, I have hereunto subscribed my name.

DAVID A. COLE.

Witnesses:
E. W. PARKER,
B. F. SOUTH.